June 23, 1970 C. N. FANGMAN 3,516,335
PISTON WITH HEAT DAM
Filed July 3, 1968
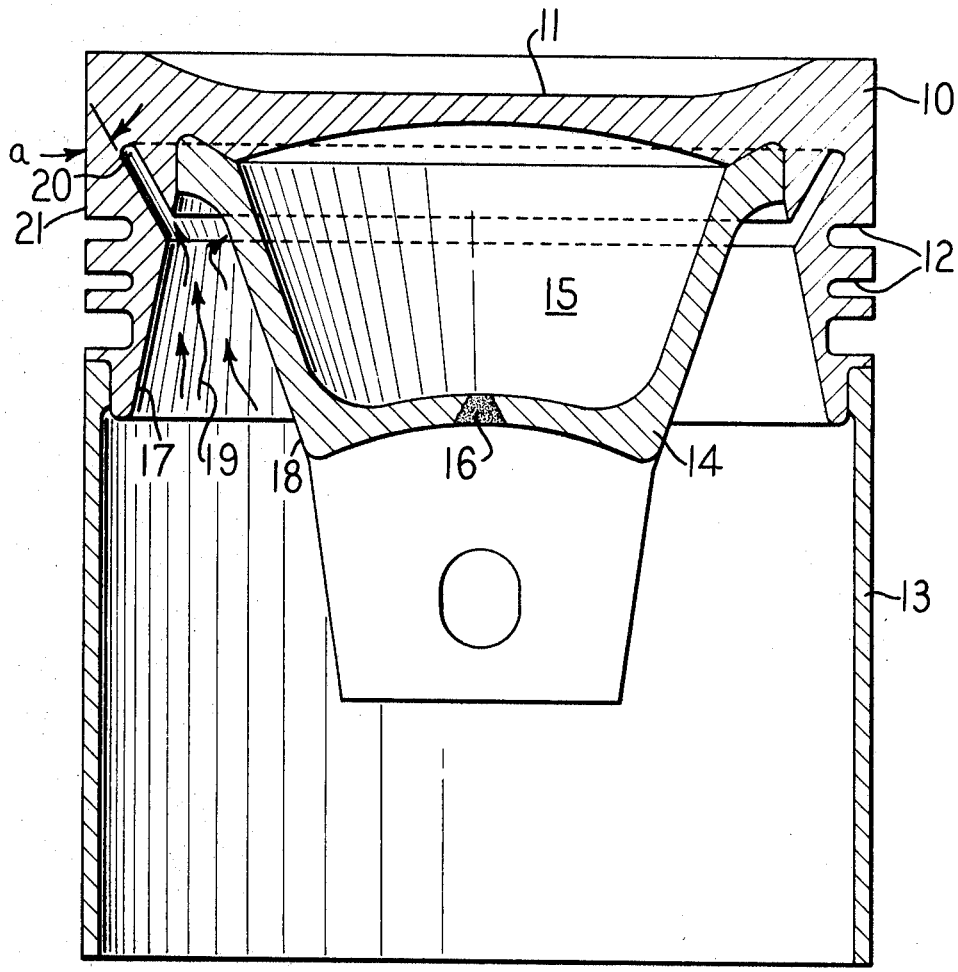
INVENTOR
CHARLES N. FANGMAN
BY
ATTORNEYS 3,516,335
PISTON WITH HEAT DAM
Charles N. Fangman, Peoria, Ill., assignor to Caterpillar Tractor Co., Peoria, Ill., a corporation of California
Filed July 3, 1968, Ser. No. 742,421
Int. Cl. F01b *31/08*
U.S. Cl. 92—176                     5 Claims

ABSTRACT OF THE DISCLOSURE

A piston comprises an annular groove formed in the head thereof, adjacent to an upper compression ring, to provide a heat dam impeding conduction of heat to the ring.

---

An appreciable amount of the heat generated in the combustion chamber of an internal combustion engine is conducted through the head and skirt portions of a conventional piston assembly. The piston rings are normally also subjected to such heat to substantially decrease the normal life expectancy thereof. One solution to such heating problem is to construct the piston and rings of high strength and highly conductive materials to at least partially compensate for the pronounced thermal expansions which the piston assembly undergoes during operation.

An object of this invention is to provide means between a piston's heated, top surface and at least one compression ring thereof to prevent the ring from being subjected to undue heat. In the preferred embodiment, such means comprises an annular groove formed in the piston's head to assume the shape of an inverted, truncated cone having its base adjacent to top surface 11. Lubricating oil, normally supplied to the piston's interior, is free to flow through such groove to absorb an appreciable amount of heat before it can be conducted to the ring.

Other objects of this invention will become apparent from the following description and accompanying drawing which is a cross-sectional view of a piston.

Referring to the drawing, the piston comprises a head portion 10 the crown of which terminates at a preferably recessed top surface 11. Such surface may be subjected to the heat generated in a combustion chamber of an internal combustion engine, for example. A plurality of annular first grooves 12 are formed on the periphery of the head to retain compression rings (not shown) therein in a conventional manner.

A skirt portion 13 and central boss 14 may be secured to the head portion by suitable inertia welding techniques or the like. The inwardly extending boss is secured to head portion 10 between top surface 11 and groove 20 and forms a chamber 15, closed by plug 16, adapted to retain a coolant such as a mercury-sodium mixture therein. Juxtaposed surfaces 17 and 18 are formed on the crown and boss, respectively, to converge towards each other in an upward direction.

The surfaces define a substantially large chamber to funnel an appreciable amount of cooling oil, illustrated by arrows 19, towards a second groove 20 of small cross-section which comprises a heat dam or means for impeding the conduction of heat from surface 11 to the groove. The annular groove is preferably formed at an angle $a$ selected from the range of from fifteen to forty-five degrees with respect to vertical outer surface portions 21 of the piston. In the embodiment disclosed, such angle closely approximates thirty degrees.

From the above description it can be seen that many advantages accrue from this invention. For example, the manner in which the head, sleeve and boss portions are fabricated together provides a piston assembly which exhibits high structural integrity. Also, groove 20 provides a heat dam which will efficiently function to prevent the rings retained in grooves 12 from becoming unduly heated. In addition, surfaces 17 and 18 will function to efficiently convey a coolant to groove 20 to constantly remove the heat absorbed by the coolant.

What is claimed is:
1. A piston comprising a head portion having at least one annular first groove formed therearound for retaining a compression ring therein, a top surface portion adapted to be subjected to heat from a combustion chamber and means defining a substantially large chamber interiorly of said head portion extending a substantial distance toward said top surface portion and directly connecting with an annular second groove formed interiorly of said head portion for communicating lubricating oil directly to and for receiving lubricating oil directly from said second groove, said direct connection being an annular intersection of said interior chamber and said second groove, said second groove having a substantially smaller cross-sectional area than said interior chamber and positioned between said top surface and said first groove for impeding the conduction of heat to said ring from said top surface portion.
2. The invention of claim 1 wherein said second groove is disposed at an angle of from fifteen to forty-five degrees relative to vertically disposed outer surface portions of said piston to form an inverted truncated cone having its base adjacent to the top surface of said head portion.
3. The invention of claim 1 further comprising a boss secured to said head portion and extending inwardly thereof to form outer surface portions converging towards said second groove along with juxtaposed surface portions formed on said head to define said interior chamber.
4. The invention of claim 1 further comprising a boss secured to said head portion and extending inwardly thereof, said boss forming a closed coolant retaining chamber therein.
5. The invention of claim 4 wherein said boss is solely secured to said head portion between said second groove and said top surface portion.

References Cited

UNITED STATES PATENTS

| 1,089,823 | 3/1914 | Day _____ | 92—176 X |
| 2,214,891 | 9/1940 | Schrom _____ | 92—176 X |
| 2,687,931 | 8/1954 | Flynn _____ | 92—186 |
| 3,204,617 | 9/1965 | Hulbert _____ | 92—186 X |
| 3,215,130 | 11/1965 | Maier _____ | 123—41.35 |

MARTIN P. SCHWADRON, Primary Examiner
I. C. COHEN, Assistant Examiner

U.S. Cl. X.R.
92—185